United States Patent
Chelikani et al.

(10) Patent No.: US 10,377,203 B2
(45) Date of Patent: Aug. 13, 2019

(54) VEHICLE TWIST AXLE ASSEMBLY

(71) Applicants: MAGNA INTERNATIONAL INC., Aurora (CA); Abhinand Chelikani, Troy, MI (US); Patrick Daniel Moritz, Meschede (DE); Johannes Peter Halbauer, Theresienfeld (AT); Sukhdeep Singh, Bakersfield, CA (US); Kevin Richard Langworthy, Davisburg, MI (US)

(72) Inventors: Abhinand Chelikani, Troy, MI (US); Patrick Daniel Moritz, Meschede (DE); Johannes Peter Halbauer, Theresienfeld (AT); Sukhdeep Singh, Bakersfield, CA (US); Kevin Richard Langworthy, Davisburg, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 15/550,984

(22) PCT Filed: Feb. 10, 2016

(86) PCT No.: PCT/US2016/017284
§ 371 (c)(1),
(2) Date: Aug. 14, 2017

(87) PCT Pub. No.: WO2016/133753
PCT Pub. Date: Aug. 25, 2016

(65) Prior Publication Data
US 2018/0029434 A1    Feb. 1, 2018

Related U.S. Application Data

(60) Provisional application No. 62/118,748, filed on Feb. 20, 2015.

(51) Int. Cl.
*B60G 21/05*    (2006.01)
*B60G 11/18*    (2006.01)
(Continued)

(52) U.S. Cl.
CPC .......... *B60G 21/051* (2013.01); *B60B 35/001* (2013.01); *B60B 35/125* (2013.01);
(Continued)

(58) Field of Classification Search
CPC .............. B60G 21/051; B60G 2200/20; B60G 2200/21; B60G 2200/23; B60G 2206/8102
See application file for complete search history.

(56) References Cited

U.S. PATENT DOCUMENTS

5,324,073 A    6/1994 Alatalo et al.
6,533,300 B1    3/2003 Hicks et al.
(Continued)

*Primary Examiner* — James A English
(74) *Attorney, Agent, or Firm* — Dickinson Wright PLLC (57) ABSTRACT

The twist axle assembly includes a pair of spaced apart trailing arms and a twist beam of which extends in a first direction between the trailing arms. The twist beam includes a pair of end portions and a middle portion. The twist beam further has a pair of side walls and at least one additional wall that extends between the side walls. The side walls in the middle portion are generally parallel with the side walls of the end portions. The twist beam is generally hour-glass shaped with the middle portion having a first width and the end portions have a greater second width. The twist beam also tapers from the first width of the middle portion to the second widths of the end portions for gradually increasing a torsional stiffness from the middle portion to the end portions.

15 Claims, 12 Drawing Sheets

(51) Int. Cl.
*B60B 35/00* (2006.01)
*B60B 35/12* (2006.01)

(52) U.S. Cl.
CPC ........ B60G 11/183 (2013.01); *B60G 2200/21* (2013.01); *B60G 2200/23* (2013.01); *B60G 2206/20* (2013.01); *B60G 2206/202* (2013.01); *B60G 2206/8102* (2013.01); *B60G 2206/8201* (2013.01)

(56) References Cited

U.S. PATENT DOCUMENTS

| | | |
|---|---|---|
| 7,556,272 B2 | 7/2009 | Marchel |
| 8,870,204 B2 | 10/2014 | Buschjohann et al. |
| 2007/0069496 A1 | 3/2007 | Rinehart et al. |
| 2008/0191443 A1 | 8/2008 | Gabbianelli et al. |
| 2009/0014775 A1* | 1/2009 | Hisamoto .......... G11C 16/0425 257/316 |
| 2009/0020974 A1* | 1/2009 | Lee ...................... B60G 21/051 280/124.107 |
| 2010/0009114 A1* | 1/2010 | Kim ...................... B21D 35/00 428/99 |
| 2010/0301577 A1 | 12/2010 | Toepker |
| 2011/0031712 A1 | 2/2011 | Bitz et al. |
| 2012/0217716 A1* | 8/2012 | Ehrlich ................ B60G 21/051 280/124.128 |
| 2015/0115564 A1* | 4/2015 | Peters .................... B21D 47/01 280/124.166 |
| 2017/0197487 A1* | 7/2017 | Langworthy ........... B60B 35/00 |
| 2018/0272827 A1* | 9/2018 | Langworthy .......... B60G 11/50 |

* cited by examiner

VEHICLE TWIST AXLE ASSEMBLY

CROSS REFERENCE TO RELATED APPLICATIONS

This U.S. National Stage Patent Application claims the benefit of PCT International Patent Application Serial No. PCT/US2016/017284 filed Feb. 10, 2016 entitled "Vehicle Twist Axle Assembly," which claims the benefit of and priority to U.S. Provisional Patent Application Ser. No. 62/118,748 filed Feb. 20, 2015, the entire disclosures of the applications being considered part of the disclosure of this application, and hereby incorporated by reference.

BACKGROUND OF THE INVENTION

1. Field of the Invention

The present invention is related, generally, to vehicle twist axle assemblies.

2. Related Art

A twist beam rear axle suspension assembly, also known as a torsion axle assembly, is a type of automobile suspension system including a pair of trailing arms, each of which is coupled with a wheel of a vehicle and with an axle of the vehicle, and a twist beam which extends transversely between the trailing arms. During operation of the vehicle, the twist beam deforms in a twisting movement when one of the wheels moves relative to another, such as during vehicle body roll or when one of the wheels encounters, for example, a pothole or an obstacle in a road. The twisting movement of the twist beam absorbs this movement to make the ride more comfortable for occupants in the vehicle body.

In order to provide the twist axle assembly with desirable performance characteristics, the entire length of the twist beam is provided with a relatively low torsional stiffness as compared to the trailing arms, thereby allowing the trailing arms to pivot relative to one another. However, this configuration may result in abrupt changes in torsional stiffness about the twisting axis at the joints between the twist beam and the trailing arms, and these abrupt changes in the torsional stiffness of the twist axle assembly at these joints could compromise the structural integrity of the joints.

One approach to improve the structural integrity of the joints between the twist axle and the trailing arms is to vary the torsional stiffness of the twist axle so as to reduce the differences in the torsional stiffnesses of the twist beam and the trailing arms at the joints. For example, one type of twist beam is configured with a crush tube design where the center area is generally V-shaped with angled, double walls and opposite end portions have closed geometrical shapes. The V-shaped center portion has a relatively lower torsional stiffness than the rectangular or circular end portions, and the twist axis is also provided with intermediate sections which transition between the V-shaped center portion and the stiffer end portions. Another approach is to add pieces to the twist beam adjacent the trailing arms to make the transition more gradual.

SUMMARY OF THE INVENTION AND ADVANTAGES

One aspect of the present invention is for a twist axle assembly for use in a vehicle. The twist axle assembly includes a pair of spaced apart trailing arms and a twist beam of a single piece which extends in a first direction between opposite ends that are operably connected with the trailing arms. The twist beam includes a pair of end portions and a middle portion which extends between the end portions. The twist beam further has a pair of side walls and at least one additional wall that extends between the side walls. The twist beam is generally hour-glass shaped with the middle portion having a first width in a second direction that is generally transverse to the first directions and the end portions have a greater second width in the second direction. The twist beam also tapers from the first width of the middle portion to the second widths of the end portions for gradually increasing a torsional stiffness from the middle portion to the end portions.

In use, the reduced torsional stiffness of the twist beam in the middle portion causes the majority of the twisting stresses from relative rotation of the trailing arms to be absorbed by the middle portion of the twist beam. This has the effect of protecting the joints between the ends of the twist beam and the trailing arms from damage that could result from twisting in the end portions. Additionally, the generally parallel relationship between the side walls of the middle portion and the end portions allows the twist beam to be made very cost effectively through stamping.

According to another aspect of the present invention, the side walls of the middle portion are generally parallel with the side walls in the end portions.

According to yet another aspect of the present invention, the side walls of the middle portion are within three degrees of being exactly parallel with the side walls in the end portions.

According to still another aspect of the present invention, the twist beam has a top wall and a bottom wall, and the middle portion has an opening formed into the bottom wall for further reducing the torsional stiffness of the middle portion in comparison to the end portions.

According to a further aspect of the present invention, the side walls of the middle portion include a plurality of apertures for further reducing the torsional stiffness of the middle portion in comparison to the end portions.

According to yet a further aspect of the present invention, the twist beam is generally U-shaped with the wall extending between the side walls being a top wall.

According to still a further aspect of the present invention, the ends of the twist beam are secured with the trailing arms through welding.

According to another aspect of the present invention, at least a portion of each of the end portions of the twist beam has a closed geometric profile.

Another aspect of the present invention is related to a method of making a twist axle assembly for a vehicle. The method includes the step of providing a pair of trailing arms. The method continues with the step of stamping a workpiece of sheet metal into a twist beam. The as-stamped twist beam has a pair of end portions and a middle portion that extends in a first direction between the end portions. The twist beam further includes a pair of side walls and at least one additional wall that extends between the side walls. Also, the twist beam is generally hour-glass shaped with the middle portion having a first width in a second direction, which is generally transverse to the first direction, and the end portions have a greater second width in the second direction. The twist beam tapers from the first width of the middle portion to the second widths of the end portions for gradually increasing a torsional stiffness of the twist beam from the middle portion to the end portions. The method proceeds with the step of attaching the twist beam with the trailing arms.

According to another aspect of the present invention, the side walls in the middle portion of the twist beam are generally parallel with the side walls in the end portions.

According to still another aspect of the present invention, the twist beam has a top wall and a bottom wall, and the middle portion has an opening formed into the bottom wall for further reducing a torsional stiffness of the middle portion in has an opening formed into the bottom wall for further reducing the torsional stiffness of the middle portion in comparison to the end portions.

According to a further aspect of the present invention, the side walls of the middle portion include a plurality of apertures for further reducing the torsional stiffness of the middle portion in comparison to the end portions.

According to yet a further aspect of the present invention, at least a portion of each of the end portions of the twist beam has a closed geometric profile.

According to still a further aspect of the present invention, the step of attaching the twist beam with the trailing arms is further defined as welding the twist beam with the trailing arms.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a first exemplary embodiment of an improved twist axle assembly 20 for a vehicle suspension system is generally shown in FIGS. 1-6. The twist axle assembly 20 includes a pair of trailing arms 22 and a twist beam 24 (also known as a cross-member) that extends in a lateral direction (which, in use, corresponds with a lateral direction of a vehicle) between the trailing arms 22. The trailing arms 22 are configured for attachment with opposing wheels of the vehicle, and in use, the trailing arms 22 pivot relative to one another in response to the vehicle rolling while cornering at speed or in response to the wheels encountering an object, such as a pot hole. The twist beam 24 resists the relative rotation of the trailing arms 22 to reduce roll and generally improve the performance of the vehicle's dynamics.

The twist beam 24 extends in a first direction between opposite ends and includes a pair of opposing end portions 26 and a middle portion 28 which extends between the end portions 26. The exemplary twist beam 24 is generally symmetrical in shape about a lateral midpoint of the twist beam 24. The end portions 26 of the twist beam 24 are connected with the trailing arms 22 for allowing the trailing arms 22 to rotate relative to one another during operation of the vehicle. The trailing arms 22 could have any suitable shapes or configurations. Both the twist beam 24 and the trailing arms 22 are preferably made of metal (such as, for example, steel, steel alloy, aluminum, aluminum alloys, magnesium, magnesium alloys, etc.).

Figure 1:
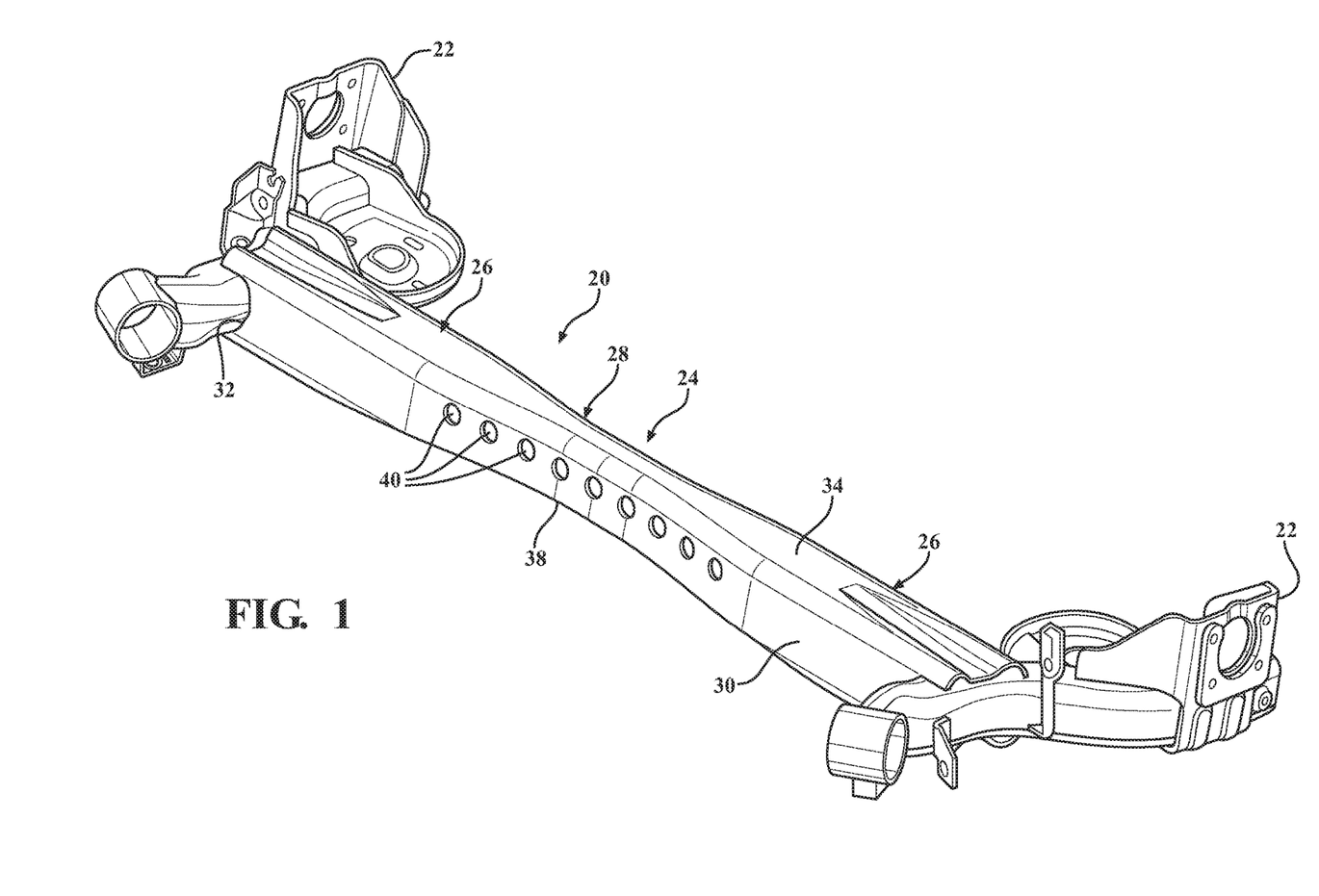
FIG. 1 is a perspective elevation view of a first exemplary embodiment of a twist axle assembly.
Figure 2:
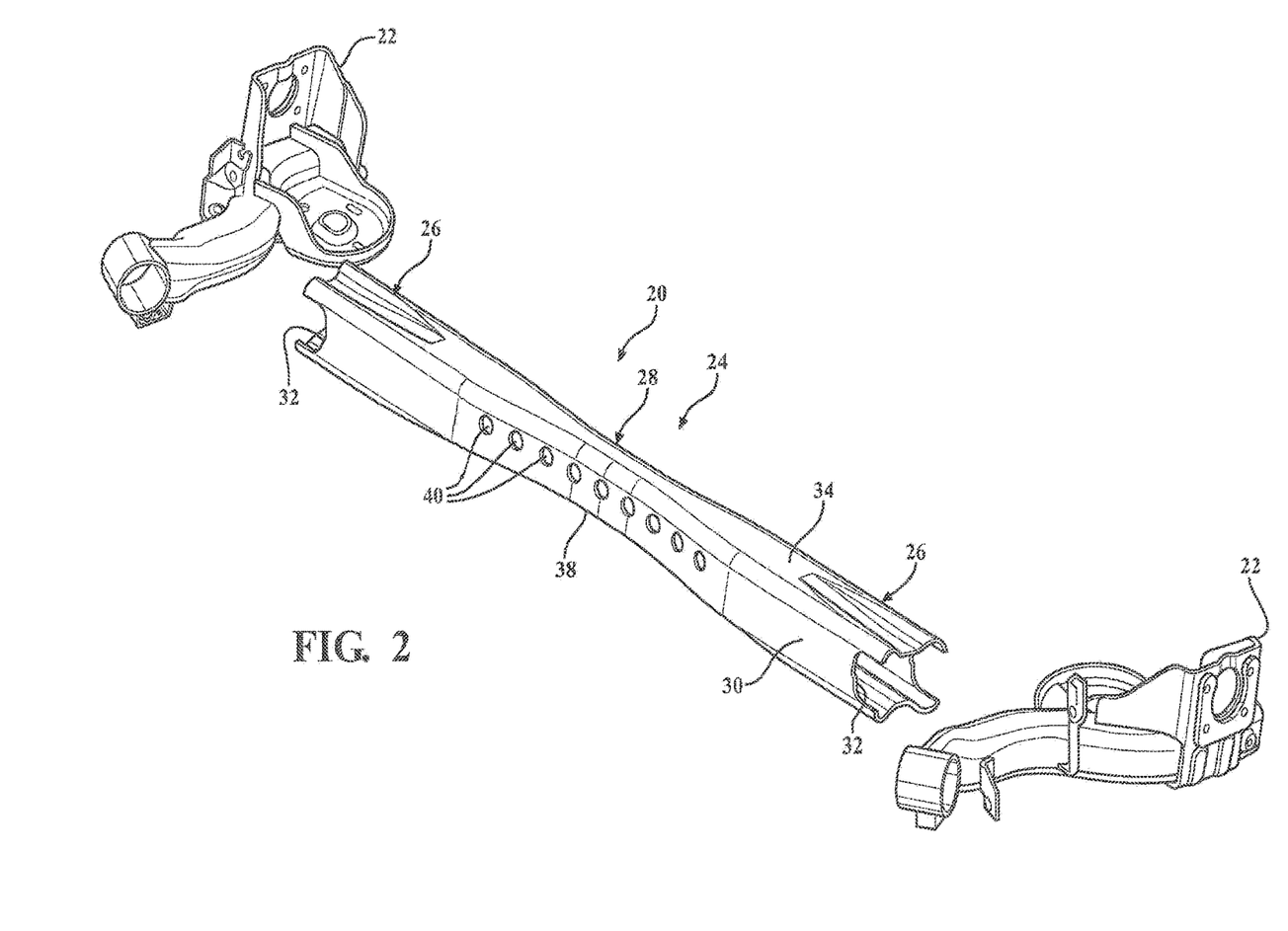
FIG. 2 is an exploded perspective view of the twist axle assembly of FIG. 1.
Figure 3:
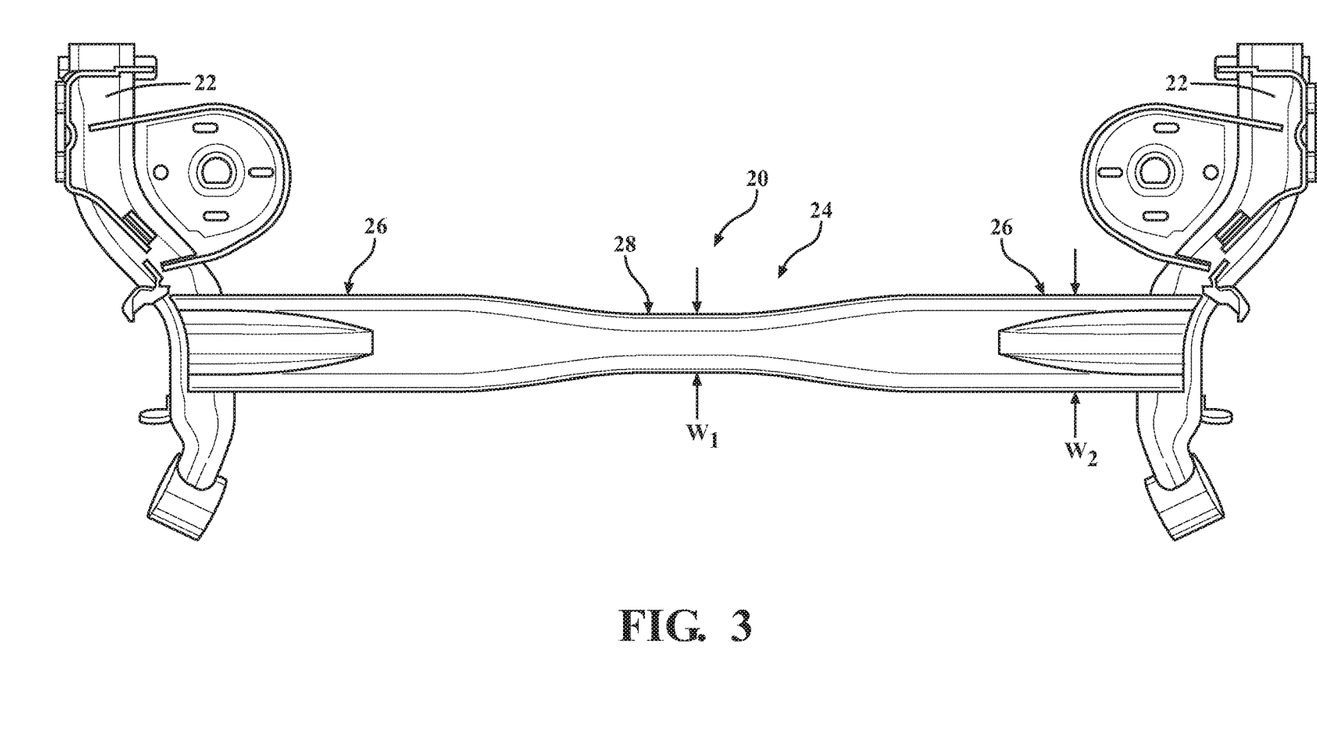
FIG. 3 is a top elevation view of the twist axle assembly of FIG. 1.

Referring still to FIG. 2, in the exemplary embodiment, the end portions 26 of the twist beam 24 are provided with spaced apart side walls 30 that have U-shaped recesses 32 formed therein. The U-shaped recesses 32 are shaped similarly to outer mating surfaces on the trailing arms 22 for establishing so-called "glove" connections with the trailing arms 22. Specifically, the trailing arms 22 are slid into the U-shaped recesses 32 on the end portions 26, and then these two components are welded together (for example, through MIG welding, TIG welding, laser welding, etc.).

Figure 4:
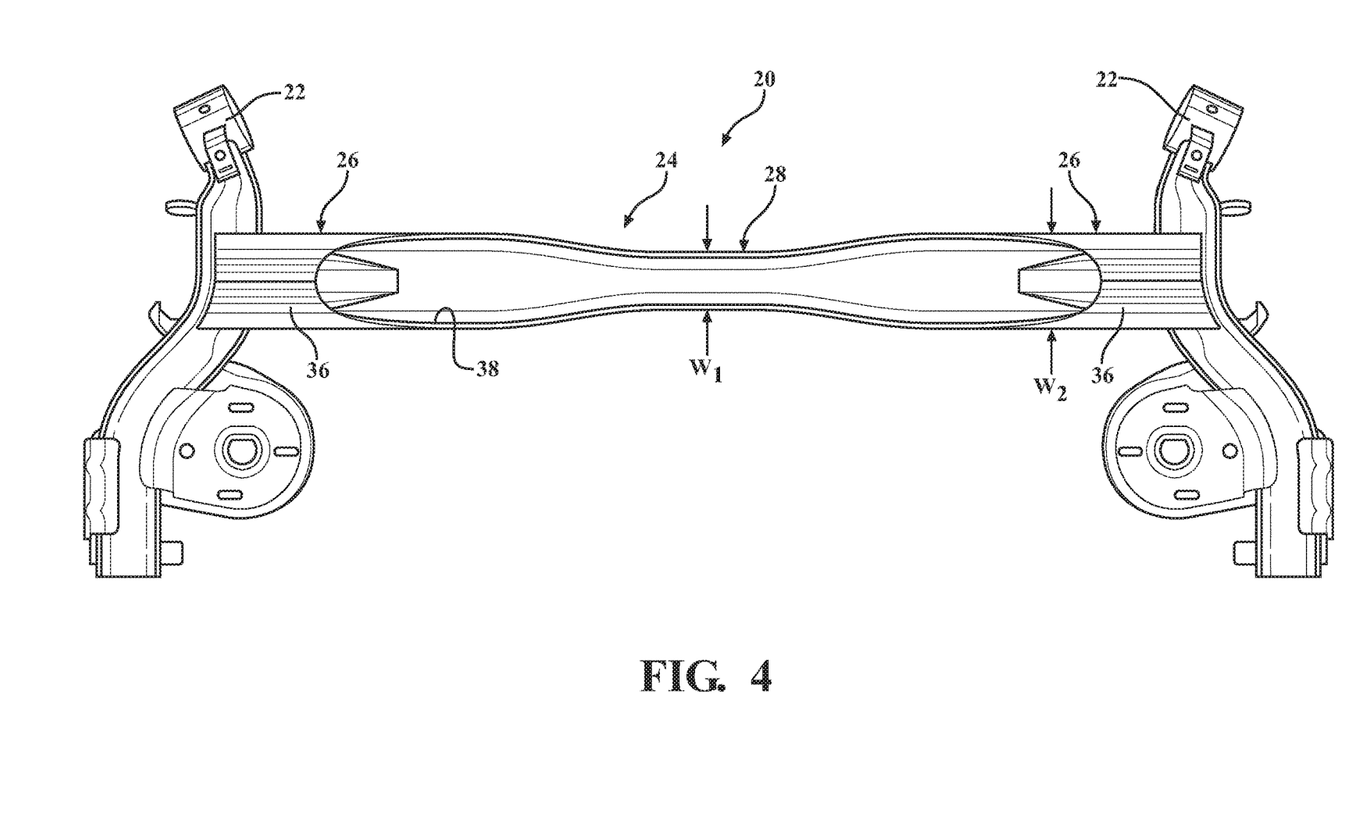
FIG. 4 is a bottom elevation view of the twist axle assembly of FIG. 1.

Referring now to FIG. 4, the exemplary twist beam 24 is generally hour-glass shaped in that it has a variable width along its length to vary a torsional stiffness of the twist beam 24 between the ends. Specifically, a portion of the middle portion 28, including a lateral midpoint of the twist beam 24, has a first width $W_1$, and a portion of each of the end portions 26 has a second width $W_2$ that is greater than the first width $W_1$ adjacent the end portions 26. The twist beam 24 transitions gradually from the lesser first width $W_1$ of the middle portion 28 to the greater second widths $W_2$ of the end portions 26 for gradually increasing the torsional stiffness of the twist beam 24 from the middle portion 28 to the end portions 26. This is advantageous because, during use, the majority of the twisting of the twist beam 24 occurs in the middle portion 28 with the lower torsional stiffness, thereby improving the durability of the weld joints between the twist beam 24 and the trailing arms 22 by protecting the weld joints from damage that could occur from twisting in the end portions 26.

Figure 5:
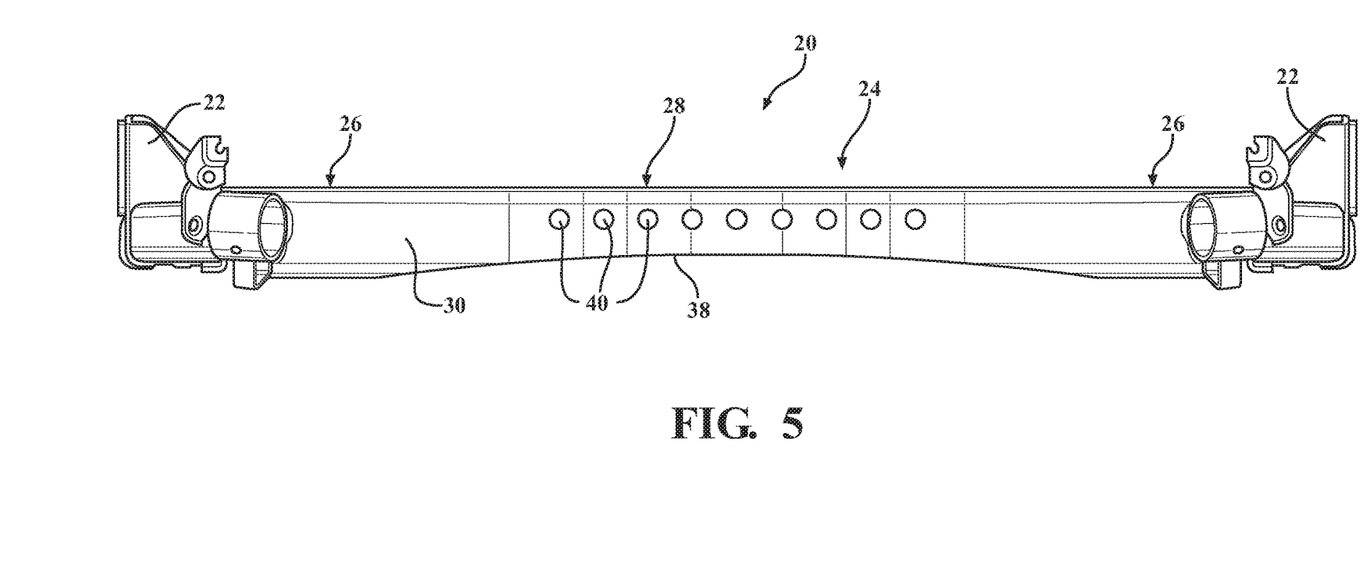
FIG. 5 is a front elevation view of the twist axle assembly of FIG. 1.
Figure 6:
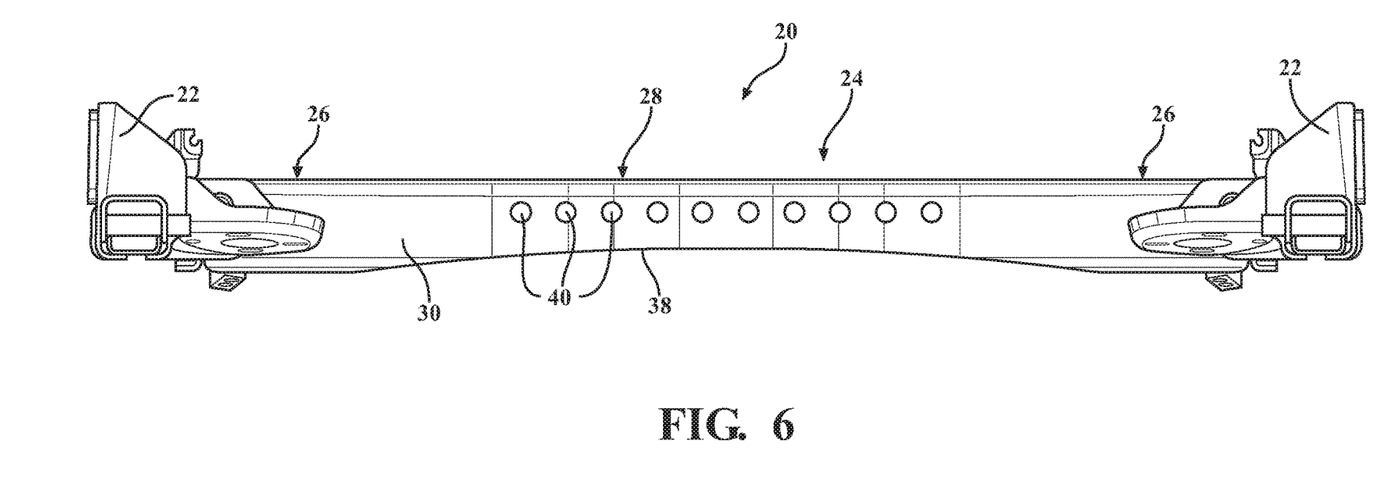
FIG. 6 is a back elevation view of the twist axle assembly of FIG. 1.
Figure 7:
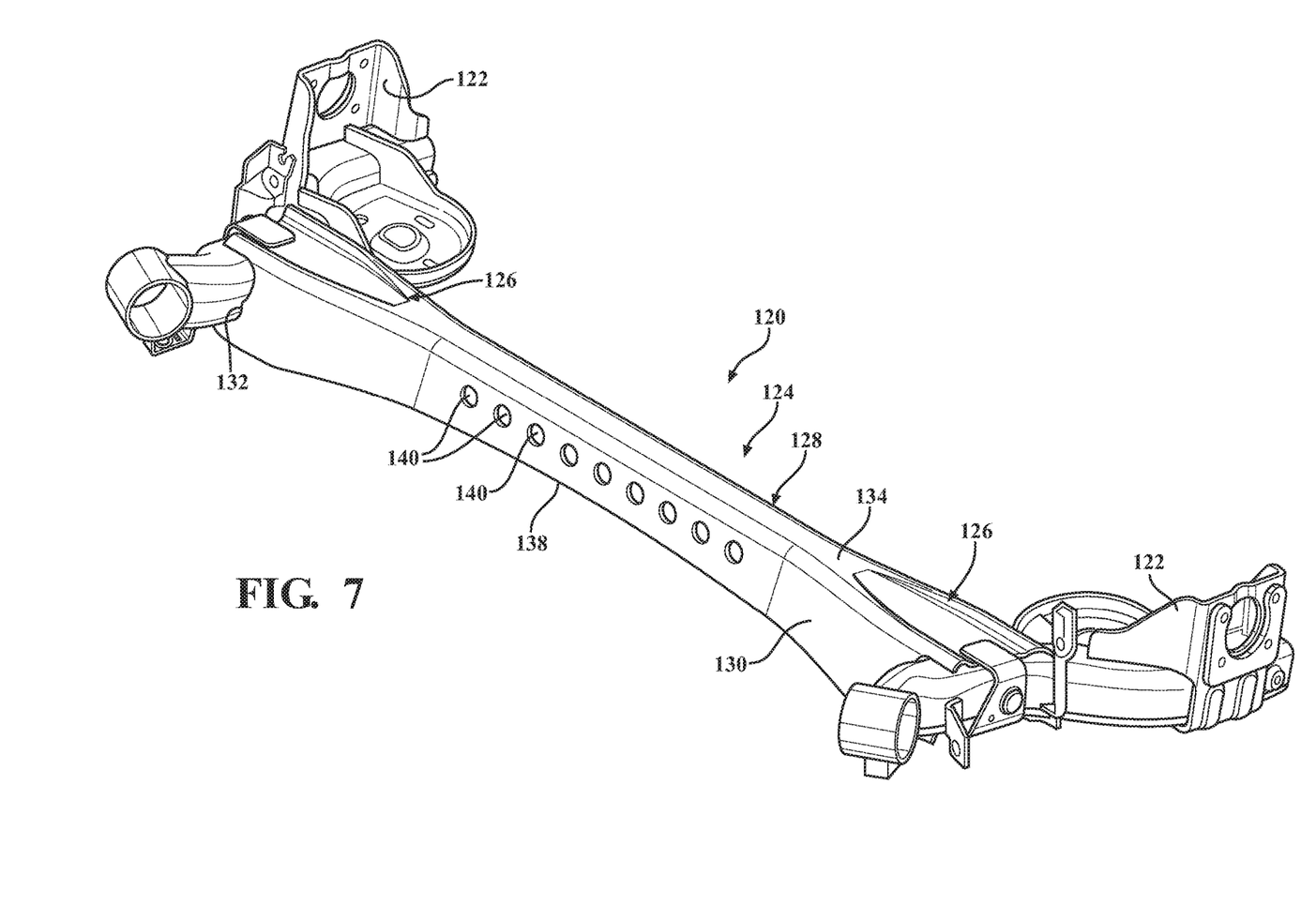
FIG. 7 is a perspective elevation view of a second exemplary embodiment of a twist axle assembly.
Figure 8:
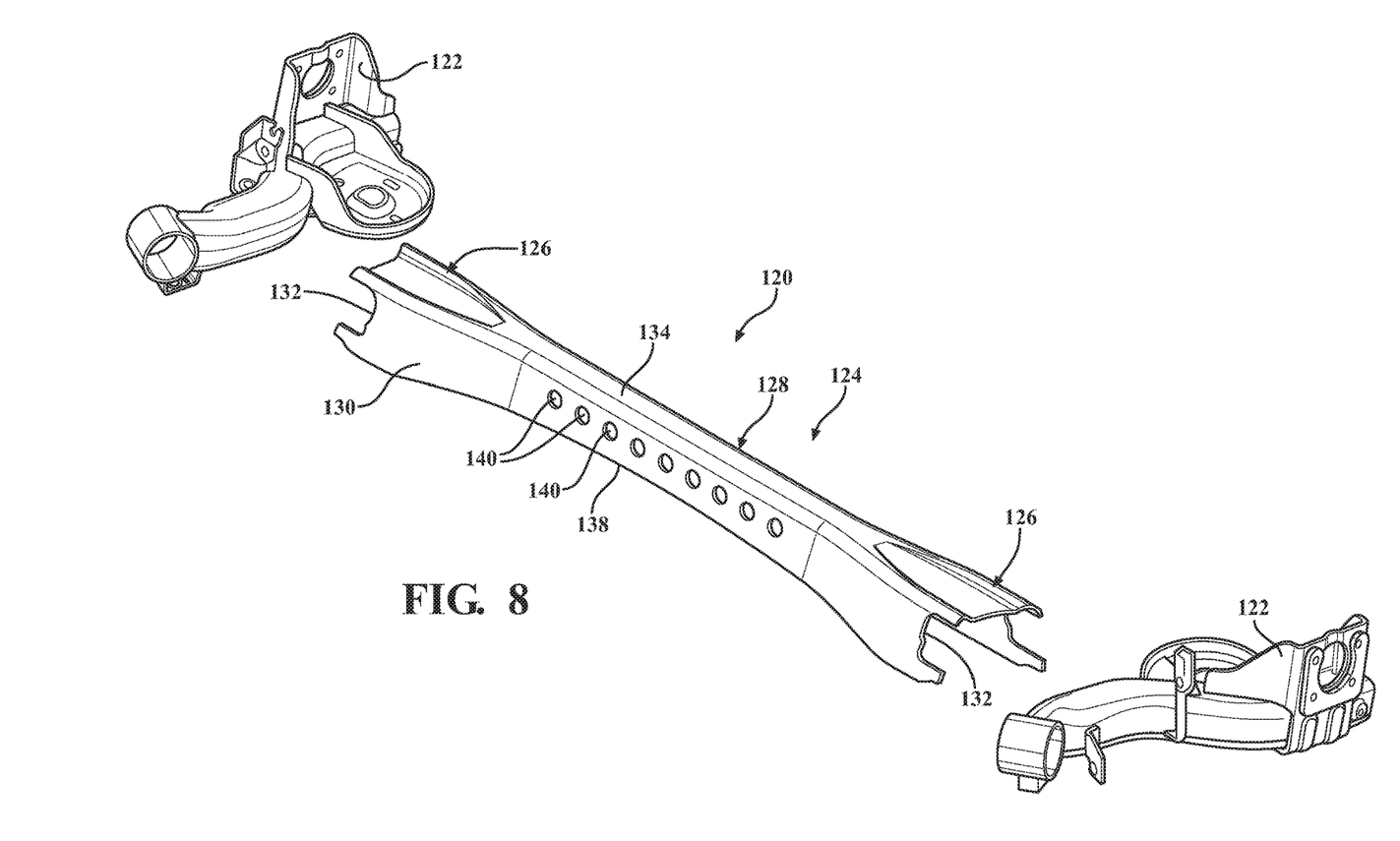
FIG. 8 is an exploded perspective view of the twist axle assembly of FIG. 7.
Figure 9:
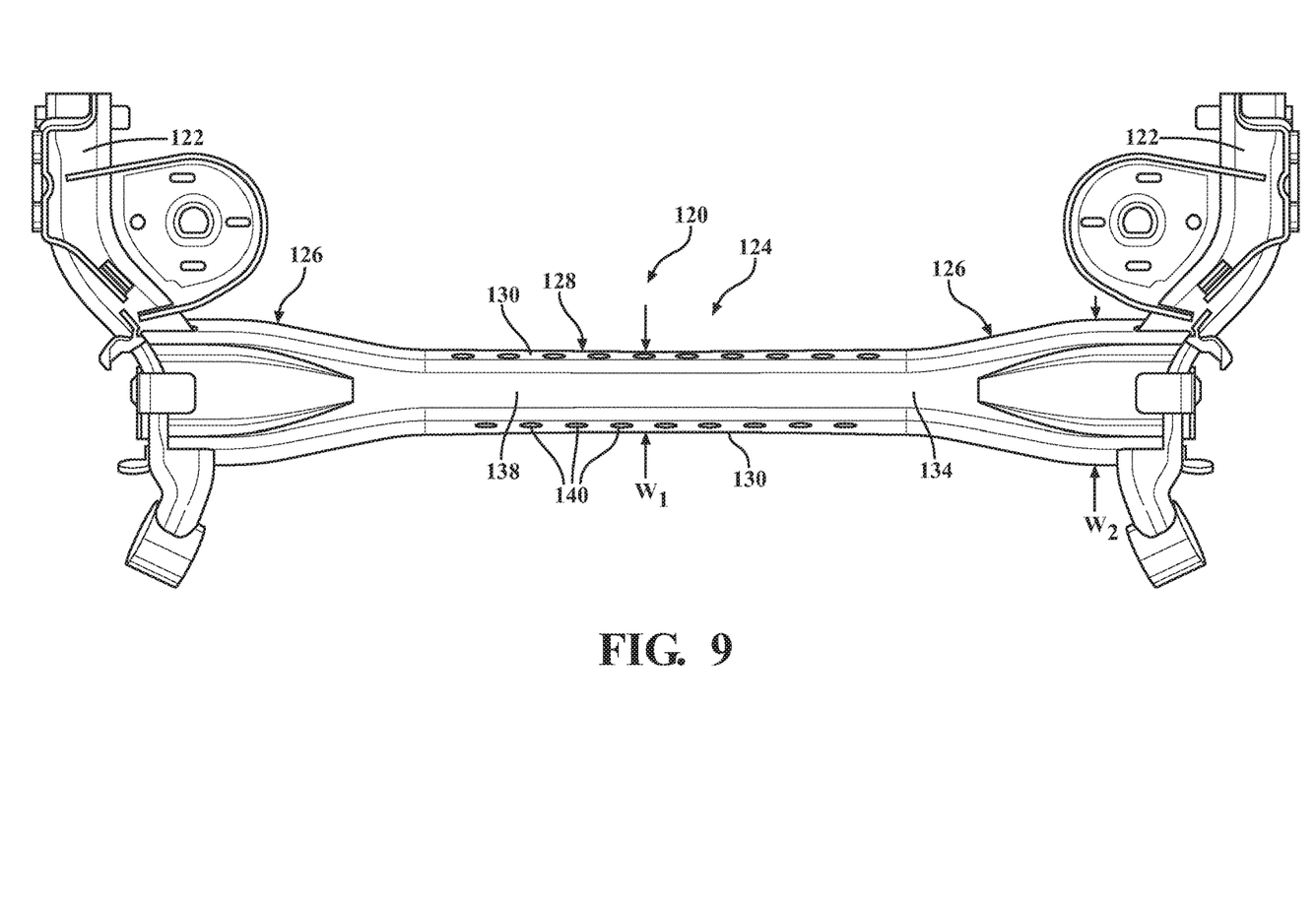
FIG. 9 is a top elevation view of the twist axle assembly of FIG. 7.

As shown, the end portions 26 of the twist beam 24 have closed (or nearly closed) geometrical profiles, and the middle portion 28 has an open, and uncrushed, geometrical profile. Specifically, the end portions 26 have generally rectangular shapes with a top wall 34 and a bottom wall 36 that extend between the side walls 30, and the middle portion 28 is generally U-shaped. In contrast to crushed tube-style twist beams, the exemplary middle portion 28 is single walled, and the open geometrical configuration is provided by an opening 38 in the bottom wall 36. This configuration further reduces the torsional stiffness of the middle portion 28 in comparison to the end portions 26 to further protect the weld joints between the twist beam 24 and the trailing arms 22. The opening 38 is generally elliptical or oval in shape such that the torsional stiffness of the twist beam 24 transitions gradually from a minimum torsional stiffness at an approximate midpoint of the middle portion 28 to the end portions 26, and the opening 38 extends at least partially into the side walls 30 (as shown in FIGS. 5 and 6). As also shown in FIGS. 5 and 6, in the middle portion 28, the side walls 30 of the exemplary twist beam 24 are provided with holes 40, or openings, that are spaced from one another in the first direction to further reduce the torsional stiffness of the middle portion 28 in comparison to the end portions 26 and thereby further protect the weld joints between the twist beam 24 and the trailing arms 22.

The side walls 30 in the middle portion 28 extend parallel or nearly parallel with one another and with the side walls 30 of the end portions 26. Specifically, in the exemplary embodiment, the side walls 30 of the middle portion 28 are angled relative to the side walls 30 of the end portions 26 by less than approximately three degrees (3°). This angle range allows for a stamping die draft during the manufacturing of the twist beam 24 to allow for low cost and highly efficient manufacturing.

Figure 10:
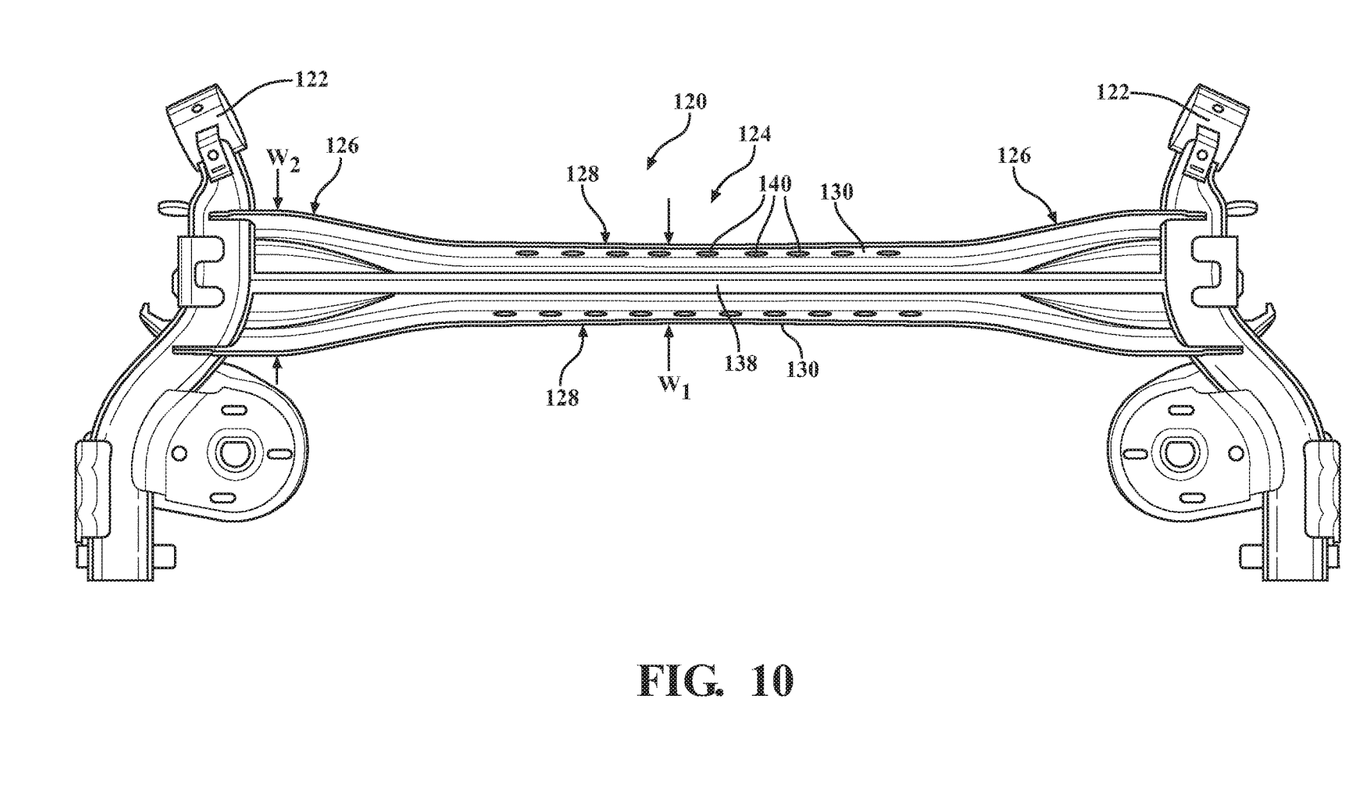
FIG. 10 is a bottom elevation view of the twist axle assembly of FIG. 7.
Figure 11:
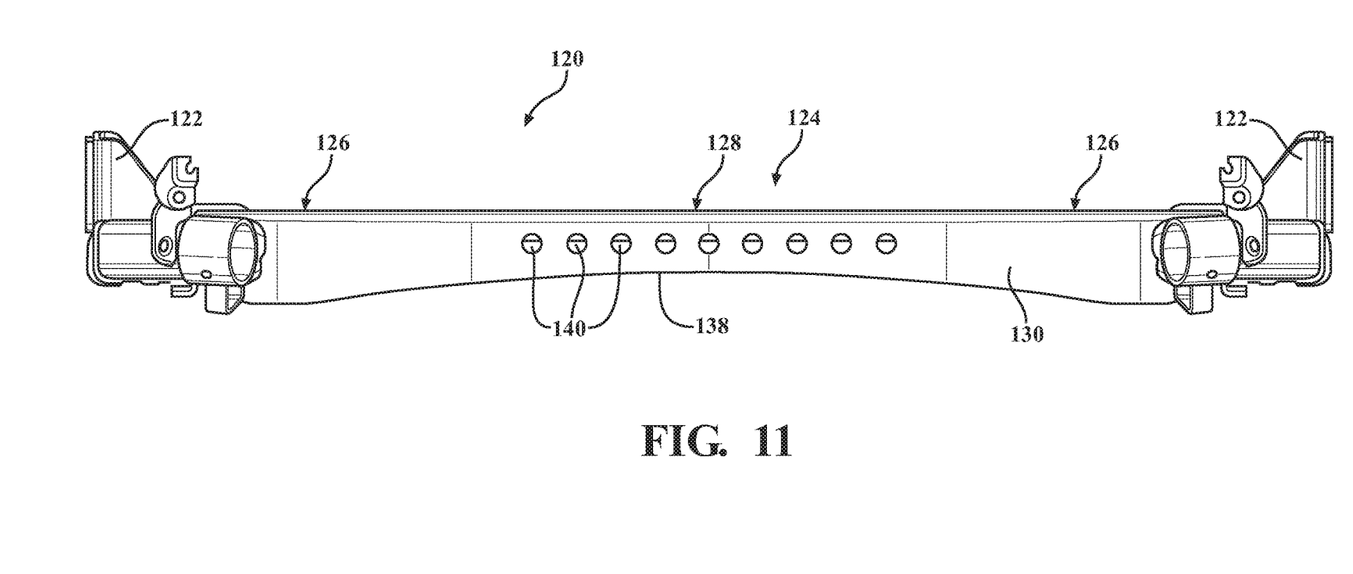
FIG. 11 is a front elevation view of the twist axle assembly of FIG. 7.
Figure 12:
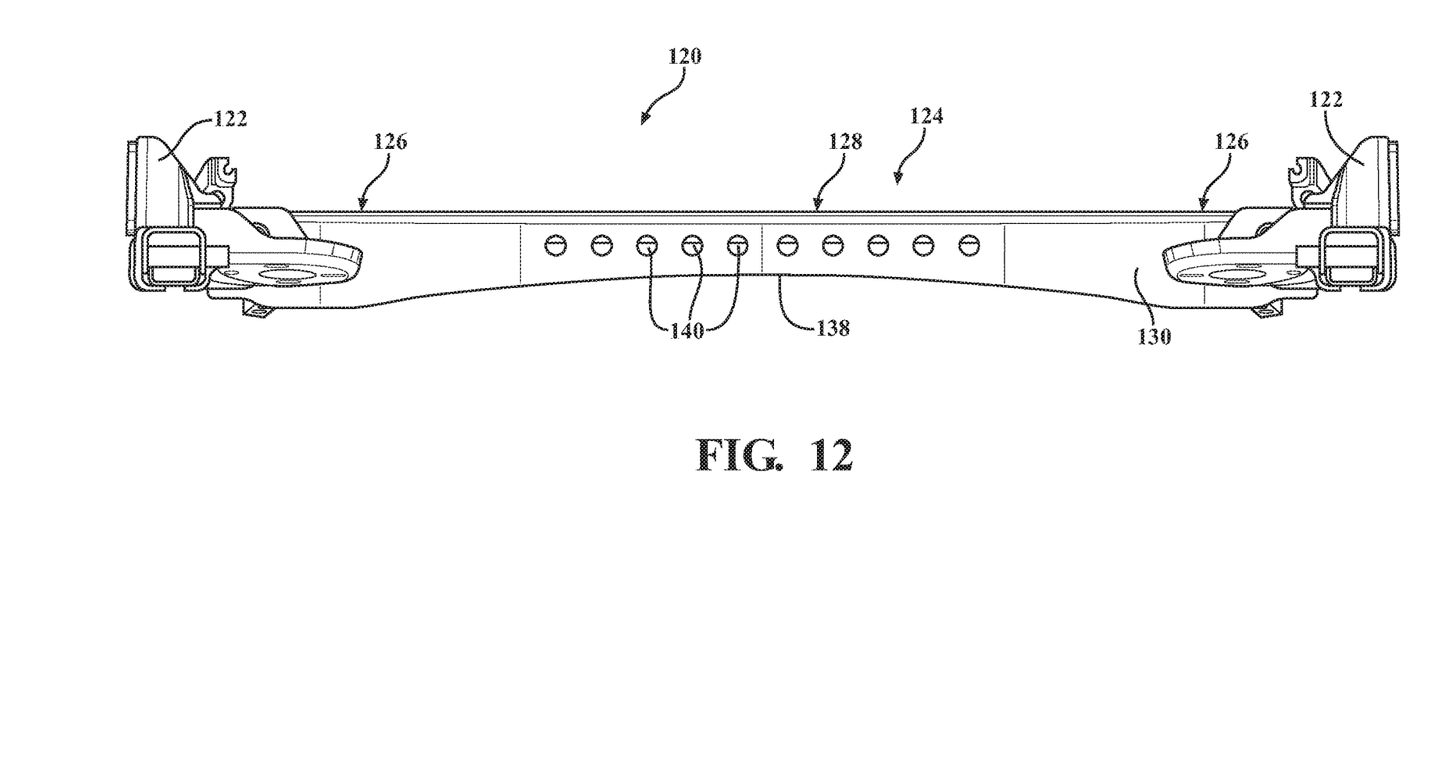
FIG. 12 is a back elevation view of the twist axle assembly of FIG. 7.

Referring now to FIGS. 7-12, a second exemplary embodiment of the twist axle assembly 120 is generally shown with like numerals, separated by a prefix of "1", indicating corresponding parts with the first exemplary embodiment described above. The second exemplary embodiment is distinguished from the first exemplary embodiment in that the twist beam 124 is generally U-shaped along its entire length. That is, as shown in FIG. 10, the twist beam 124 of the second exemplary embodiment lacks a bottom wall. Since the twist beam 124 of this embodiment lacks a bottom wall, the opening 138 for reducing the torsional stiffness of the middle portion 128 is only in the side walls 130. Similar to the first exemplary embodiment described above, at least a portion of the middle portion 128 of the twist beam 124 has a first width $W_1$ which is less than a second width $W_2$ at the end portions 126. Additionally, the second embodiment is distinguished from the first embodiment in that while the side walls 130 of the middle portion 128 do extend in parallel with the side walls 130 of the end portions 126, the side walls 130 of each of the end and middle portions 128 are angled relative to one another.

Another aspect of the present invention is a method of making a twist axle assembly 20 for use in a vehicle suspension system. The method includes the step of providing a pair of trailing arms 22. The method continues with the step of stamping a workpiece (such as a generally planar blank) into a twist beam 24 with a pair of end portions 26 and a middle portion 28 that extends in a first direction between the end portions 26. The twist beam 24 has a pair of side walls 30 and at least one additional wall that extends between the side walls 30. The side walls 30 in the middle portion 28 are generally parallel with the side walls 30 in the in the end portions 36. The twist beam 24 is generally hour-glass shaped with the middle portion 28 having a first width $W_1$ in a second direction, which is generally transverse to the first direction, and the end portions 26 have a greater second width $W_2$ in the second direction. The twist beam 24 tapers from the first width $W_1$ in the middle portion 28 to the second width $W_2$ of the end portions 26 for gradually increasing a torsional stiffness of the twist beam 24 from the middle portion 28 to the end portions 26. The method proceeds with the step of attaching the end portions of the twist beam 24 with the trailing arms 22.

Obviously, many modifications and variations of the present invention are possible in light of the above teachings and may be practiced otherwise than as specifically described while within the scope of the appended claims.

What is claimed is:

1. A twist axle assembly for a vehicle, comprising:
a pair of spaced apart trailing arms;
a twist beam of a single piece, said twist beam extending in a first direction between opposite ends that are secured with said trailing arms, and said twist beam including a pair of end portions and a middle portion which extends between said end portions;
said twist beam having a pair of side walls and at least one additional wall extending between said side walls;
said at least one additional wall of said twist beam having, along an entire length of said middle portion which extends on both sides of and across a midpoint of said twist beam, a constant first width in a second direction that is generally transverse to said first direction;
said at least one additional wall of said twist beam having, in each of said end portions, a second width in said second direction, said second width being greater than said first width, and wherein said at least one additional wall of said twist beam tapers from said first width of said middle portion to said second widths of said end portions for gradually increasing a torsional stiffness of said twist beam from the middle portion to the end portions; and
in said middle portion, said twist beam being single-walled and having a U-shaped open geometrical configuration as viewed in cross-section.

2. The twist axle assembly as set forth in claim 1 wherein said side walls in said middle portion are generally parallel with said side walls in said end portions and are offset from said side walls in said end portions in said second direction.

3. The twist axle assembly as set forth in claim 2 wherein said side walls in said middle portion are within three degrees of being exactly parallel with said side walls in said end portions.

4. The twist axle assembly as set forth in claim 1 wherein said at least one additional wall of said twist beam is a top wall and wherein said twist beam further includes a bottom wall and wherein said middle portion has an opening formed into said bottom wall for further reducing the torsional stiffness of said middle portion in comparison to said end portions.

5. The twist axle assembly as set forth in claim 1 wherein said side walls of said middle portion include a plurality of apertures for further reducing the torsional stiffness of said middle portion in comparison to said end portions.

6. The twist axle assembly as set forth in claim 1 wherein said twist beam is generally U-shaped with said at least one additional wall extending between said side walls being a top wall.

7. The twist axle assembly as set forth in claim 1 wherein said end portions of said twist beam are secured to said trailing arms through welding.

8. The twist axle assembly as set forth in claim 1 wherein at least a portion of each of said end portions of said twist beam has a closed geometric profile.

9. A method of making a twist axle assembly, comprising the steps of:
providing a pair of trailing arms; and
stamping sheet metal into a twist beam with a pair of end portions, a middle portion that extends in a first direction between the end portions and extends across a midpoint of the twist beam, a pair of side walls, at least one additional wall that extends between the side walls, the additional wall having, along the entire length of the middle portion, a first width in a second direction that is generally transverse to the first direction, the at least one additional wall, in each of the end portions, having a second width in the second direction, the second width being greater than the first width, and the at least one additional wall tapering from the first width of the middle portion to the second widths of the end portions for gradually increasing a torsional stiffness of the twist beam from the middle portion to the end portions; and attaching the twist beam with the trailing arms.

10. The method as set forth in claim 9 wherein the side walls in the middle portion of the twist beam are generally parallel with the side walls in the end portions and are offset from the side walls in the end portions in the second direction.

11. The method as set forth in claim 10 wherein the side walls in the middle portion of the twist beam are within three degrees of being exactly parallel with the side walls in the end portions.

12. The method as set forth in claim 9 wherein the at least one additional wall of the twist beam is a top wall and a bottom wall and wherein the middle portion has an opening formed into the bottom wall for further reducing the torsional stiffness of the middle portion in comparison to the end portions.

13. The method as set forth in claim 9 wherein the side walls of the middle portion include a plurality of apertures for further reducing the torsional stiffness of the middle portion in comparison to the end portions.

14. The method as set forth in claim 9 wherein at least a portion of each of the end portions of the twist beam has a closed geometric profile.

15. The method as set forth in claim 9 wherein the step of attaching the twist beam with the trailing arms is further defined as welding the twist beam with the trailing arms.

* * * * *